(12) United States Patent
Watanabe

(10) Patent No.: US 9,759,588 B2
(45) Date of Patent: Sep. 12, 2017

(54) IMPACT FLOWMETER FOR POWDERS AND GRANULES

(71) Applicant: SANKYO PIO-TECH CO., LTD., Tokyo (JP)

(72) Inventor: Kinnosuke Watanabe, Kanagawa (JP)

(73) Assignee: SANKYO PIO-TECH CO., LTD., Tokyo (JP)

( * ) Notice: Subject to any disclaimer, the term of this patent is extended or adjusted under 35 U.S.C. 154(b) by 0 days.

(21) Appl. No.: 15/090,719

(22) Filed: Apr. 5, 2016

(65) Prior Publication Data
US 2016/0298989 A1    Oct. 13, 2016

(30) Foreign Application Priority Data

Apr. 9, 2015  (JP) ................. 2015-079759

(51) Int. Cl.
*G01F 1/30*    (2006.01)

(52) U.S. Cl.
CPC ..................... *G01F 1/30* (2013.01)

(58) Field of Classification Search
CPC ..................... G01F 1/30; G01F 1/28
USPC .......................... 73/861.73, 861.72
See application file for complete search history.

(56) References Cited

U.S. PATENT DOCUMENTS

| | | | | |
|---|---|---|---|---|
| 4,765,190 A | * | 8/1988 | Strubbe | A01D 41/1271 222/71 |
| 5,065,632 A | * | 11/1991 | Reuter | G01F 1/28 73/861.73 |
| 5,698,794 A | * | 12/1997 | Bussian | G01F 1/708 73/861.73 |
| 6,651,516 B2 | * | 11/2003 | Soderholm | G01G 11/043 73/861.73 |

FOREIGN PATENT DOCUMENTS

| | | |
|---|---|---|
| JP | 56-67714 | 6/1981 |
| JP | 57-189013 | 11/1982 |
| JP | 57-56684 | 12/1982 |
| JP | 63-195524 | 8/1988 |
| JP | 07-505706 | 6/1995 |
| JP | 10-142016 | 5/1998 |

(Continued)

OTHER PUBLICATIONS

Office Action issued in Japan Counterpart Patent Appl. No. 2015-079759, dated Nov. 30, 2016.

(Continued)

*Primary Examiner* — Jewel V Thompson
(74) *Attorney, Agent, or Firm* — Greenblum & Bernstein, P.L.C.

(57) ABSTRACT

An object of the present invention is to provide an impact flowmeter for powders and granules which can be installed with a smaller investment by removing a part of components in an existing process and improving the process with a minimum cost, without involving relocation, especially in the vertical direction, of devices composing the process, in order to meet a recent demand. Provided is an impact flowmeter for powders and granules, wherein a flow straightener is omitted by adopting a multiple detection plate structure in which detection plates of the multiple detection plate structure are coupled together through a side plate and are suspended inside a casing by four leaf springs.

2 Claims, 2 Drawing Sheets

(56) References Cited

FOREIGN PATENT DOCUMENTS

JP     10-185638     7/1998
JP     2004-37330     2/2004

OTHER PUBLICATIONS

"Flow Meter for Powders and Granules", Sensor Technology, vol. 10, No. 12, Oct. 11, 1990.
"Flow Meter for Powders and Granules", Measurement Management, vol. 33, No. 7, 1984.
"Installation of Automatical Control of Powder and Granular Materials by Impactline Flow Meter", Journal of the Research Association of Powder Technology, vol. 7, No. 6, 1970.
"Selections of Flow Meter for Powders Including Stuffy", Measurement Technology, Jan. 2015.

\* cited by examiner

[Fig. 1]
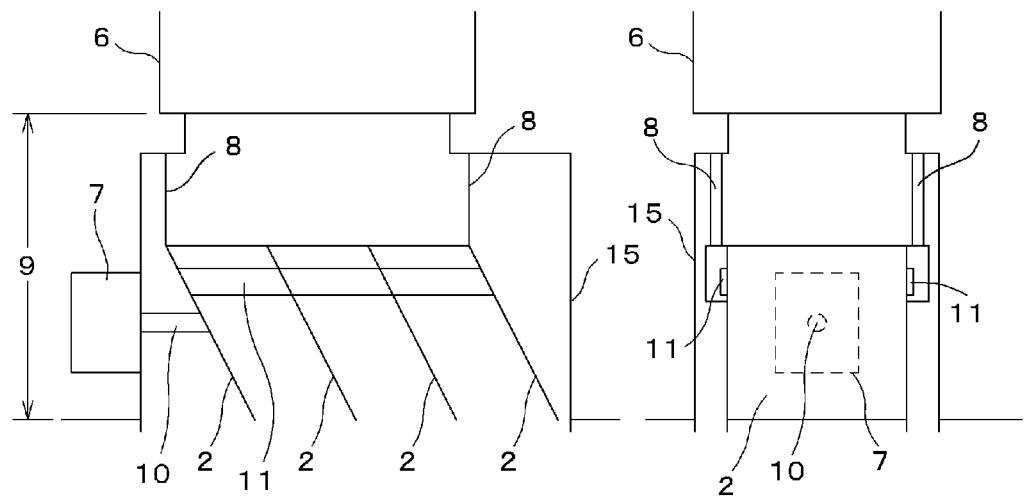
[Fig. 2]
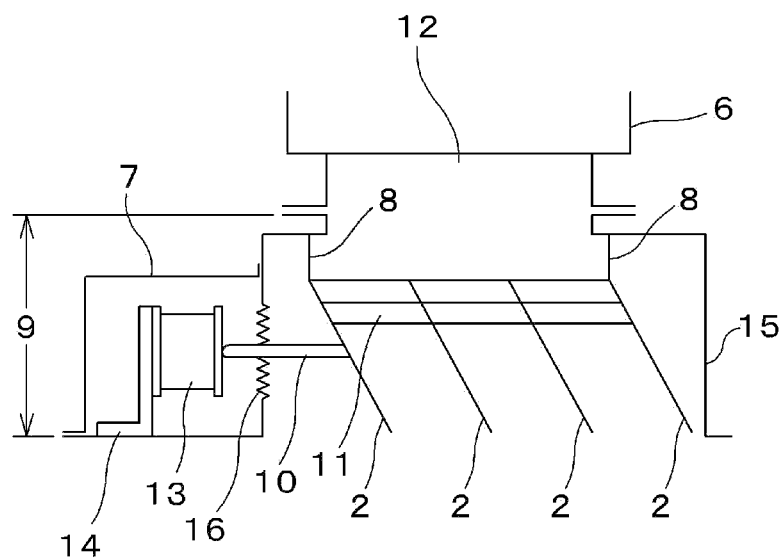

[Fig. 3]
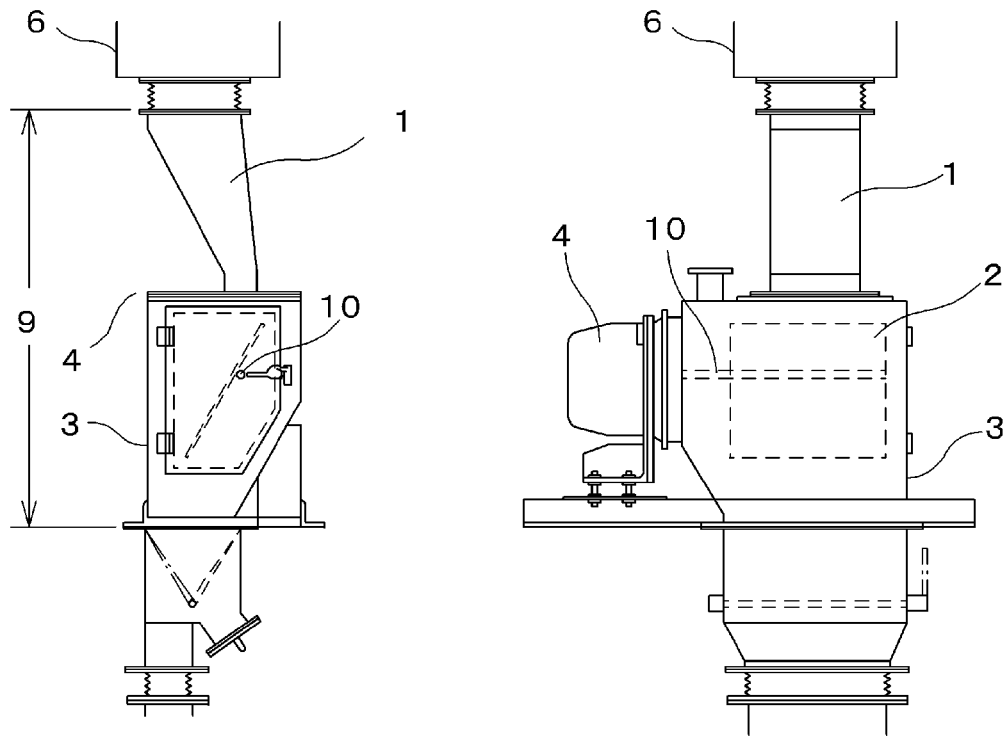
[Fig. 4]
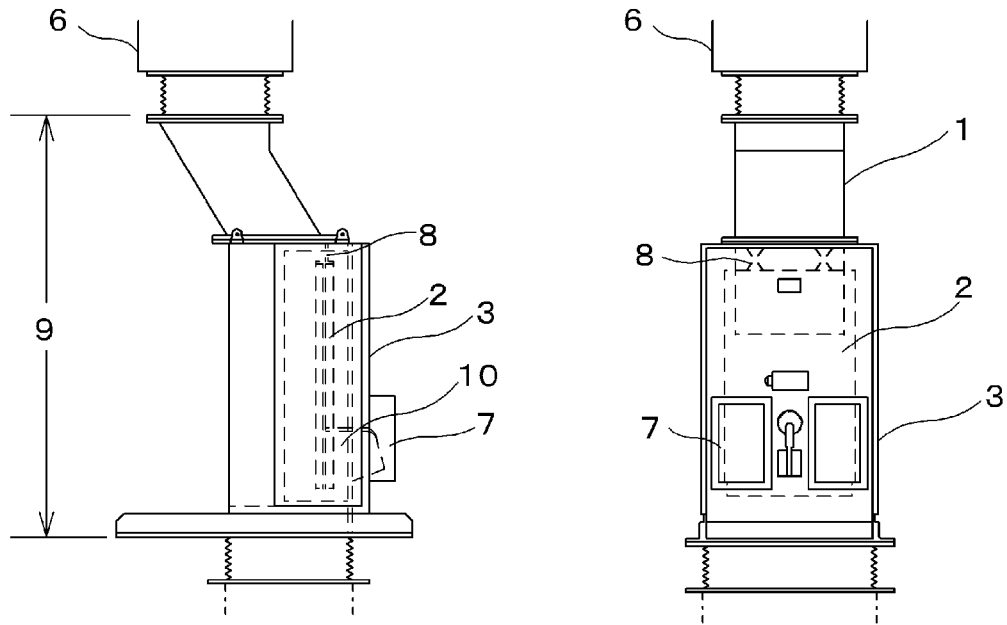

IMPACT FLOWMETER FOR POWDERS AND GRANULES

BACKGROUND OF THE INVENTION

Field of the Invention

The present invention relates to an impact flowmeter for powders and granules, and more particularly to a space where this impact flowmeter for powders and granules is installed.

Description of the Prior Art

While impact flowmeters for powders and granules of various structures are commercially available today, there has been demand for maintaining a small installation space of an impact flowmeter for powders and granules.

As disclosed in FIG. 3, in a prior art of an impact flowmeters for powders and granules with a flow straightener which include a single detection plate provided at an angle ("Installation of automatical control of powder and granular materials by impactline flow meter," Journal of the Research Association of Powder Technology, Vol. 7, No. 6, 1970; and "Selections of Flow Meter for Powders Including Slurry", Measurement Technology, January 2015), a powder being an object to be measured is fed from a feeder 6 installed on top of the impact flowmeter for powders and granules, and the flow of the powder is straightened in a flow straightener 1 before the powder free-falls to a nearly predetermined position in a detection plate 2 which is provided at an angle on a detection shaft 10 of a transmitter 4 of the impact flowmeter for powders and granules. In this prior art, an increase in the space required for installation is unavoidable due to the flow straightener 1 required, as is an increase in the length in the vertical direction due to the one-plate structure of the detection plate, so that the installation space 9 inevitably measures 100 centimeters or more. Another drawback is that the weight of the detection plate 2 is limited due to the limited strength of the detection shaft 10.

As disclosed in FIG. 4, in another prior art of an impact flowmeter for powders and granules with a flow straightener which includes a single vertical detection plate (see picture 2 on page 15 of Measurement Technology, January 2015, "Selections of Flow Meter for Powders Including Slurry"), one detection plate 2 is vertically installed by being suspended inside a flow channel 3 by two leaf springs 8, and the flow straightener 1 is provided at an angle to save space. One drawback is that an installation space 9 of 100 centimeters or more is required. Another is that the impinging position, at which the powders and granules falling through the flow straightener 1 impinge on the detection plate 2, lowers as the flow rate of the powders and granules decreases, due to the friction force acting against the flow of the powders and granules. When the flow rate decreases below the critical flow rate, the powders and granules do not impinge on the detection plate 2.

DOCUMENTS OF PRIOR ART

Patent Documents

[Patent Document 1] Japanese Publication of Unexamined Patent Application No. 2004-37330

Non-Patent Documents

[Non-Patent Document 1] "Flow Meter for Powders and Granules", Measurement Management, Vol. 33, No. 7, 1984

[Non-Patent Document 2] "Installation of Automatical Control of Powder and Granular Materials by Impactline Flow Meter", Journal of the Research Association of Powder Technology, Vol. 7, No. 6, 1970

[Non-Patent Document 3] "Selections of Flow Meter for Powders Including Slurry", Measurement Technology, January 2015

Objects of the present invention include the following:
1. To resolve the drawbacks of the prior art.
2. To realize an impact flowmeter for powders and granules having a smaller installation space compared with the installation space of conventional impact flowmeters.
3. To reduce and narrow the installation space of the impact flowmeter as much as possible.
4. To make possible, the installation of an impact flowmeter to existing facilities at minimal cost.
5. To improve existing processes at low cost.

Specifically, an object of the present invention is to provide an impact flowmeter for powders and granules which can be installed in a small space of about 20 to 40 centimeters between the upper side and the lower side of the impact flowmeter for powders and granules.

SUMMARY OF THE INVENTION

To solve the above problems, the present invention provides an impact flowmeter for powders and granules, wherein the flow straightener is omitted by adopting a multiple detection plate structure in which the detection plates are coupled together through a side plate 11 and the detection plate structure is suspended inside a flow channel by leaf springs.

Moreover, in the impact flowmeter for powders and granules of the present invention, the installation space 9 of the impact flowmeter for powders and granules measures 20 to 40 centimeters.

According to the present invention, a multiple detection plate structure in which the detection plates 2 are coupled together through a side plate 11 is adopted, and the horizontal plane area of the detection plate structure is set to be slightly larger than the plane area of a powder and granule outlet of the feeder. Thus, the flow straightener can be omitted and the installation space is reduced accordingly.

Although the impact flowmeter for powders and granules of the present invention has a four detection plate structure, the number of the plates can be adjusted according to the properties of the powders and granules. For highly adhesive powders, a two- or three-plate structure can be adopted to increase the interval between the plates and thereby avoid a failure caused by adhesion of the powders to the plates. For granules, a four- to six-plate structure should be adopted. The same applies where the object to be fed is slurry. The space 9 decreases or increases as the number of the plates increases or decreases.

According to the present invention, a Roberval mechanism with four leaf springs suspending the detection plates is configured, so that, wherever in the detection plates powders and granules may impact, no variation occurs in the impact force transmitted to a receiving mechanism.

BRIEF DESCRIPTION OF THE DRAWINGS

FIG. 1 is a front view and a side view of the inside of an impact flowmeter for powders and granules of the present invention;

FIG. 2 is a detailed front view of the impact flowmeter for powders and granules of the present invention;

FIG. 3 is a front view and a side view of the inside of an impact flowmeter for powders and granules with a flow straightener and a single detection plate of a prior art; and FIG. 4 is a front view and a side view of the inside of an impact flowmeter for powders and granules with a flow straightener and a single detection plate of another prior art.

DETAILED DESCRIPTION OF THE PREFERRED EMBODIMENT

First, an embodiment of the present invention will be described with respect to the operation thereof in detail below with reference to FIG. 1 and FIG. 2.

Powders and granules discharged from a feeder 6 free-fall and impinge on detection plates 2, generating an impact force on the detection plates 2. Since the detection plate structure are suspended inside a flow channel 3 by four leaf springs 8, the detection plate structure can move in an approximately horizontal direction. This impact force is transmitted via a detection shaft 10 to a transmitting mechanism 7. That is, the left end of the detection shaft 10 pushes a load cell 13, for example, which is housed inside the transmitting mechanism 7, and the impact force is converted by the load cell 13 into an electrical signal and sent to a receiver. In the case of the load cell 13, since the amount of displacement under impact load is extremely small, the detection plate structure barely moves.

In FIG. 2, the detection shaft 10 comes into contact with the load cell 13, and the transmitting mechanism 7 and casing 15 are separated from each other by a diaphragm 16 attached to the casing 15 and detection shaft 10. The impact force generated on the detection shaft 10 pushes the load cell 13 fixed to a load cell holder 14, causing the load cell 13 to send an electrical signal. The casing 15 is directly connected to a powder and granule outlet 12 of the powder and granule feeder 6, and there is no flow straightener 1, which is provided in the conventional impact flowmeter for powders and granules (FIG. 3 and FIG. 4), between the casing 15 and the feeder 6. This has an excellent advantage in that all the powders and granules free-falling from the powder and granule outlet 12 impinge on the detection plates 2 under the same conditions.

By contrast in a conventional impact flowmeter (FIG. 3 and FIG. 4), since powders and granules impinging on the detection plate 2 via the flow straightener 1 are gathered by the flow straightener 1, the free-fall conditions vary according to the position in the powder and granule outlet 12 at which the powders and granules exit.

In FIG. 1 or FIG. 2, the flowmeter has a multiple detection plate structure in which the detection plates 2 are coupled together through a side plate 11, and the horizontal plane area of the detection plate structure is set to be slightly larger than the plane area of the powder and granule outlet of the feeder 6, and thus the flow straightener can be omitted. An impact force proportional to the flow rate of powders and granules is generated on the detection plates 2 due to a physical phenomenon. The detection shaft 10 is held inside the casing 15 by the leaf springs 8 so as to move only in a substantially horizontal direction.

In FIG. 3, the portion of the detection shaft 10 inside the transmitting mechanism is fitted with a coil spring. The detection shaft 10 is held by pivots located on the upper and lower sides thereof, and the detection shaft 10 rotates to a position at which only the horizontal component of an impact force generated on the detection plate 2 and a reaction force of the coil spring are balanced in displacement. The amount of displacement is converted into an electrical signal by an electrical conversion mechanism inside the transmitting mechanism 7 and electrically sent to the receiving mechanism to be processed as the value of the flow rate of the powders and granules.

In FIG. 1 or FIG. 2, the detection plate structure has a four-plate structure, but the number of the plates can be adjusted according to the properties of the powders and granules. For example, for highly adhesive powders, a two- or three-plate structure can be adopted to increase the interval between the plates and thereby avoid a failure caused by adhesion of the powders to the plates. For granules, a four- to six-plate structure should be adopted. The space 9 decreases or increases as the number of the plates increases or decreases. Of course, the plane area of the detection plate structure should be designed to be larger than that of the powder and granule outlet of the feeder 6. According to the design, the minimum space 9 measures 20 centimeters at the minimum in the case of a detection plate structure with five plates, and 35 centimeters at the minimum in the case of a detection plate structure with two plates. In these cases, it is necessary to maintain the space 9 so that the impact force generated on the detection plate structure is large enough to be electrically processed by the transmitting mechanism 7.

In FIG. 1 or FIG. 2, there are four leaf springs 8 suspending the detection plates 2, and these leaf springs 8 constitute a Roberval mechanism. The detection plates 2 of the detection plate structure are provided at an angle on a side plate 11 by being suspended by the leaf springs 8 inside the casing 15 which corresponds to the flow channel 3 in FIG. 3 and FIG. 4. Owing to this Roberval mechanism, wherever in the detection plate structure powders and granules may impact, for the same flow rate, there is no variation in the impact force transmitted to the receiving mechanism.

FIG. 3 shows the inside of the impact flowmeter for powders and granules with a flow straightener which includes a single detection plate. A powder being an object to be measured is fed from the feeder 6 and free-falls through the flow straightener 1 to an approximately predetermined position in the detection plate 2 which is provided at an angle on the detection shaft 10 of the transmitter 4 of the impact flowmeter for powders and granules. An impact force proportional to the flow rate of the powder is generated on the detection plate 2 due to a physical phenomenon. The detection shaft 10 is held by pivots located on the upper and lower sides thereof inside the transmitter 4, and rotates the pivots only in the horizontal direction. The detection shaft 10 is fitted with a coil spring on the opposite side of the detection plate 2. The detection shaft 10 rotates to a position at which only the horizontal component of an impact force generated on the detection plate 2 and a reaction force caused by the displacement of the coil spring are in equilibrium. The amount of displacement is converted into an electrical signal by an electrical conversion mechanism inside the transmitter 4 and electrically sent to the receiving mechanism to be processed as the value of the flow rate of the powder.

FIG. 4 shows the inside of another impact flowmeter for powders and granules with a flow straightener which includes a single detection plate 2. One detection plate 2 is suspended inside the flow channel 3 by two leaf springs 8. To reduce the installation space, the flow straightener 1 is provided at an angle. A horizontal component of an impact force generated on the detection plate 2 is transmitted via the detection shaft 10 to the transmitting mechanism 7, and the electrical Signal is electrically sent to the receiver. This flowmeter also requires a space 9 of 100 centimeters or more. The impinging position, at which the powders and granules falling through the flow straightener 1 impinge on the detection plate 2 lowers as the flow rate of the powders and granules decreases, because the velocity of the flow of the powders and granules decreases due to a friction force acting against the flow of the powders and granules. When the flow rate becomes lower than the critical flow rate, the powders and granules do not impinge on the detection plate 2. In this case, there is structurally no limitation on the weight of the detection plate 2. The transmitter 4 and the flow channel 3 of the flowmeter in FIG. 4 are integrated, unlike the impact flowmeter for powders and granules of FIG. 3 in which the transmitter 4 and the flow channel 3 are independent of each other.

REFERENCE SIGNS LIST

1 Flow straightener
2 Detection plate
3 Flow channel
4 Transmitter
6 Feeder
7 Transmitting mechanism
8 Leaf spring
9 Installation space
10 Detection shaft
11 Side plate
12 Powder and granule outlet
13 Load cell
14 Load cell holder
15 Casing
16 Diaphragm

What is claimed is:

1. An impact flowmeter for powders and granules and slurries, wherein a flow straightener is omitted by adopting a multiple detection plate structure, wherein the detection plates of the multiple detection plate structure are inclined and connected with a side plate to detect or measure an impact force on the detection plates when the powders, granules, and slurries discharged from a feeder are free-falling and impinge on the detection plates, and the detection plates are suspended inside a casing by a plurality of leaf springs to provide a Roberval mechanism.

2. The impact flowmeter for powders and granules and slurries according to claim 1, wherein an installation space of the impact flowmeter for powders and granules measures 20 to 40 centimeters vertically.

* * * * *